United States Patent
Lindland

(10) Patent No.: US 10,155,893 B2
(45) Date of Patent: Dec. 18, 2018

(54) HIGH MOLECULAR WEIGHT PAG COOLANT FOR GRINDING GLASS

(71) Applicant: Larry Lindland, Camus, WA (US)

(72) Inventor: Larry Lindland, Camus, WA (US)

( * ) Notice: Subject to any disclaimer, the term of this patent is extended or adjusted under 35 U.S.C. 154(b) by 76 days.

(21) Appl. No.: 15/411,383

(22) Filed: Jan. 20, 2017

(65) Prior Publication Data

US 2017/0233626 A1    Aug. 17, 2017

Related U.S. Application Data

(60) Provisional application No. 62/281,887, filed on Jan. 22, 2016.

(51) Int. Cl.
| | | |
|---|---|---|
| B24B 9/08 | (2006.01) | |
| C09K 5/10 | (2006.01) | |
| C09K 3/18 | (2006.01) | |
| B24B 9/06 | (2006.01) | |

(52) U.S. Cl.
CPC ............... *C09K 5/10* (2013.01); *B24B 9/06* (2013.01); *B24B 9/08* (2013.01); *C09K 3/18* (2013.01)

(58) Field of Classification Search
CPC ............... B24B 9/08; C09K 3/18; C09K 5/10
USPC .......................................................... 451/44
See application file for complete search history.

(56) References Cited

U.S. PATENT DOCUMENTS

| | | | |
|---|---|---|---|
| 3,374,171 A | 3/1968 | Davis | |
| 3,802,860 A | 4/1974 | Gorman | |
| 4,033,886 A | 7/1977 | Felton, Jr. | |
| 4,481,367 A * | 11/1984 | Knopf | C08G 18/4837 252/67 |
| 4,828,737 A | 5/1989 | Sandberg et al. | |
| 5,749,773 A | 5/1998 | Tabata | |
| 6,114,462 A * | 9/2000 | Watanabe | G03F 7/0045 525/191 |
| 6,634,929 B1 | 10/2003 | Visser | |
| 8,840,803 B2 | 9/2014 | Mazyar et al. | |
| 2012/0115765 A1 | 5/2012 | Gutfrucht et al. | |

(Continued)

FOREIGN PATENT DOCUMENTS

| | | |
|---|---|---|
| CN | 102102008 A | 6/2011 |
| WO | WO2005/042676 A2 | 5/2005 |
| WO | WO2012/129056 A1 | 9/2012 |

OTHER PUBLICATIONS

Allen, F.S. et al., "On the quenching characteristics of polyalkylene glycol solutions in water," Abstract, Materials Science and Engineering, vol. 95, Nov. 1997, Internet Pages http://www.sciencedirect.com/science/article/pii/002554168790517, printed Aug. 7, 2015, 1 page.

(Continued)

*Primary Examiner* — George Nguyen
(74) *Attorney, Agent, or Firm* — Woodard, Emhardt, Moriarty, McNett & Henry LLP

(57) ABSTRACT

Described are various coolant and/or lubricating compositions. Also described are various methods for grinding glass that employ such a coolant and/or lubricating composition. Such compositions may find use in the grinding of glass, such as automotive glass, flat glass, ophthalmic glass, precision ophthalmic glass, ceramics, quartz, solar glass, precision optical glass, lens glass, architectural glass, curtain wall glass, appliance glass, electronic-device glass, and/or various plastics.

31 Claims, 3 Drawing Sheets

(56) References Cited

U.S. PATENT DOCUMENTS

| | | | |
|---|---|---|---|
| 2012/0214385 A1* | 8/2012 | Zhu | C10M 169/044 451/36 |
| 2013/0228160 A1* | 9/2013 | Menon | B28D 5/007 125/20 |
| 2014/0335762 A1 | 11/2014 | Tamai et al. | |
| 2015/0000710 A1* | 1/2015 | Hasegawa | C09K 5/10 134/42 |

OTHER PUBLICATIONS

Beatty, Daryl, "PAGs are Rising to the top of the Synthetic Market," Internet Pages http://www.machinerylubrication.com/Read/930/pag-synthetic-oil, printed Aug. 7, 2015, 3 pages.
Croucher, Tom, "Using Olyalkylene Glycol Quenchants to Effectively Control Distortion and Residual Stresses in Heat Treated Aluminum Allooys," Abstract vol. 5, Issue 10, Nov. 2008; http://www.astm.org/DIGITAL_LIBRARY, printed Aug. 7, 2015, 1 page.
Matlock, Paul L. et al., "Polyalkylene Glycols," Synthetic Lubricants and High-Performance Functional Fluides, Second Edition, Chapter 6, 1999, pp. 159-193.
International Patent Application PCT/US2017/014364 Search Report dated May 4, 2017. 3 pages.
International Patent Application PCT/US2017/014364 Written Opinion dated May 4, 2017. 8 pages.

\* cited by examiner

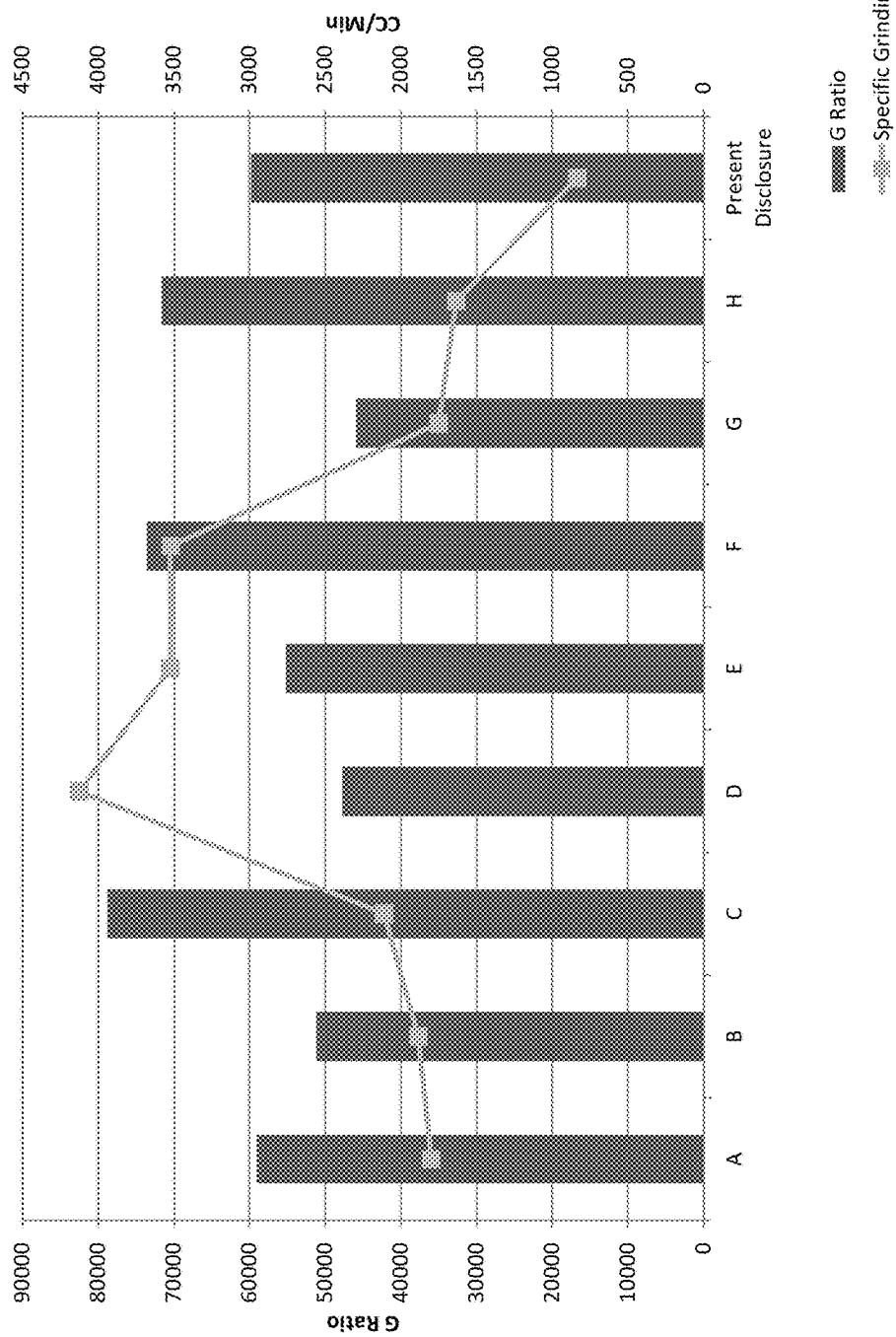

HIGH MOLECULAR WEIGHT PAG COOLANT FOR GRINDING GLASS

PRIORITY CLAIM TO RELATED APPLICATIONS

This application claims the right of priority to U.S. Provisional Patent Application No. 62/281,887, filed on Jan. 22, 2016, the entirety of which is hereby incorporated by reference in its entirety.

BACKGROUND

The process of manufacturing glass often comprises the steps of, moving from the hot end towards the cold end, charging the raw materials (for example, in a batch house), melting the raw materials in a furnace, floating the melted raw materials to form a glass float, annealing the glass, and cutting the glass.

Once glass is manufactured this way, there are often additional steps that are required to cut the glass into a desired size for a product or use. In doing so, the glass may be damaged by chipping, cracking, or forming other defects.

In light of this background, there remains a need for new grinding methods, new polishing methods, and/or new compositions of matter used in grinding methods and/or polishing methods.

SUMMARY

In aspects of the present invention, polyoxyakylene glycols may be used in methods for grinding of glass. Polishing a substrate may also be performed according to methods disclosed herein.

In certain aspects of the present invention, the polyoxyalkylene glycols used in various embodiments may have a viscosity of greater than or equal to about 660 centipoise (cP) as measured by viscometry. In other aspects, the polyoxyalkylene glycols used may have a viscosity of greater than or equal to about 5,000 cP. In other aspects, the polyoxyalkylene glycols used may have a viscosity of greater than or equal to about 90,000 cP. In other aspects, the polyoxyalkylene glycols used may have a viscosity of greater than or equal to about 280,000 cP. In other aspects, the polyoxyalkylene glycols used may have a viscosity of greater than or equal to about 380,000 cP.

In some aspects, the polyoxyalkylene glycols used in embodiments described herein may be available commercially and may be marketed under trade names such as JEFFOX WL-5000 or UCON™ Lubricant. In other embodiments, the polyoxyalkylene glycols used in embodiments described herein may be commercially marketed or sold by BASF or Clariant, and/or others.

In still other aspects, methods employing a polyoxyalkylene glycol may reduce the grinding energy at the grind interface as measured in Joules per cubic centimeter of glass removed (J/cm$^3$). In certain aspects, methods disclosed herein may extend wheel dressing cycles. In additional aspects, methods disclosed herein may reduce burns on the substrate. In further aspects, methods disclosed herein may improve the removal rate as measured in cubic centimeters per minute (cm$^3$/min). In other further aspects, the methods disclosed herein increase the G Ratio of grinding.

In another aspect, a polyxoyalkylene glycol may be used in methods for grinding an edge of glass to produce an edge configuration. In some embodiments such edge configurations include a beveled edge, rounded edge, pencil edge, flat edge, chamfer edge, half bull nose edge, O.G. edge, or a waterfall edge configuration. Various edge configurations such as these are shown in FIG. 1.

In still other aspects, compositions comprising a polyoxyalkylene glycol may also comprise additional compositions. For example, compositions comprising polyoxyalkylene glycols may also comprise, but are not limited to, a surfactant, a defoaming agent, an amine, a settling aid, a carboxylic acid, an abrasive, a passivator, a corrosion control additive, a microbial control agent, and/or an antimisting agent.

In still other aspects, methods for grinding a substrate may comprise grinding the substrate in the presence of a coolant. Such substrates include, but are not limited to, glass, automotive glass, flat glass, ophthalmic glass, precision ophthalmic glass, ceramics, quartz, solar glass, optical glass, precision optical substrates, lens glass, architectural glass, curtain wall glass, appliance glass, electronic-device glass, and/or plastics such as, but not limited to, opthalmic plastics.

Additional embodiments of the invention, as well as features and advantages thereof, will be apparent from the descriptions herein.

BRIEF DESCRIPTION OF THE DRAWINGS

FIG. 1 shows a drawing of various edge configurations that may be used in certain embodiments of the present disclosure.

FIG. 2 shows a graph of the grinding ratio, removal rate, and specific grinding energy of several commercially available coolants (A through H), and the coolant according to one embodiment of the present disclosure.

DETAILED DESCRIPTION

Figure 1A:
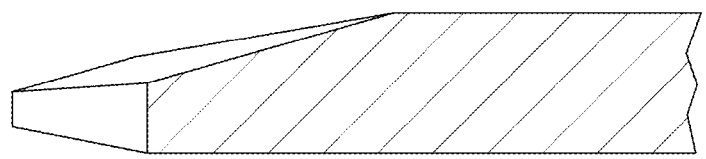
FIG. 1A shows a side view of an embodiment of a beveled edge configuration.

For the purposes of promoting an understanding of the principles of the invention, reference will now be made to certain embodiments and specific language will be used to describe the same. It will nevertheless be understood that no limitation of the scope of the invention is thereby intended, such alterations and further modifications, and such further applications of the principles of the invention as described herein being contemplated as would normally occur to one skilled in the art to which the invention relates.

As used herein, polyoxyalkylene glycols and polyalkylene glycols, sometimes abbreviated "PAG," are used in various embodiments of the present disclosure. This nomenclature may be used interchangeably in the present disclosure. Without being bound by theory, PAG typically refers to the general class of polymers formed by polymerization, of alkylene oxides (sometimes called "epoxides") often by initiation using for example, but not limited to, alcohols, diols, among other compounds as initiators. PAGs can include, but are not limited to, homopolymers, heteropolymers, block co-polymers, reverse block copolymers, and/or random copolymers. Typically, the alkylene oxides used are ethylene oxide and/or propylene oxide, but other higher alkylene oxides may be used in certain embodiments. For example, alkylene oxides may comprise carbon chains of two carbons in length to about eight carbons in length and such carbon chains may be linear chains or branched chains. In certain embodiments, the polymers used may be glycols such as, but not limited to propylene glycol, diethylene glycol, triethylene glycol, ethylene glycol, carbo wax 400, and/or carbo wax 600.

In certain embodiments of the present disclosure, methods for grinding a substrate are disclosed. As used herein, grinding means the removal a portion of a substrate, and includes, but is not limited to polishing. In some embodiments, the method comprises grinding the substrate in the presence of a coolant. In certain embodiments, grinding is performed by moving the substrate and/or an abrasive so that there is some relative motion between the substrate and/or abrasive.

As used herein, a substrate is the thing that is being ground, or having its volume or size reduced by removing a portion of it. Substrates that may be provided and/or used in embodiments of the present disclosure include, but are not limited to, glasses for example, but not limited to, automotive glass, flat glass, ophthalmic glass, precision ophthalmic glass, solar glass, precision optical glass, lens glass, architectural glass, curtain wall glass, appliance glass, and/or electronic device glass. Other substrates that can be provided and/or used in embodiments of the present disclosure include, but are not limited to non-metal substrates, ceramics, quartz, and/or plastics including, but not limited to, optical plastics and/or ophthalmic plastics.

The compositions of the present disclosure may be considered to be "non-active" when referring to the lubricity of chemistry of the coolant. For example, coolants used in the metal working industry may be considered active coolants as they may have some affect on the metal in terms of lubricity or surface chemistry of the metal. For example, in the metalworking industry chlorates may be used to provide such active lubricity or chemistry.

Coolants may be applied to a substrate before, during, and/or after grinding has commenced. Alternatively, a coolant may be applied to a an abrasive before, during, and/or after grinding has commenced. The coolant may be continuously applied to a substrate and/or abrasive and/or the coolant may be discontinuously applied to a substrate and/or abrasive. The coolant may be applied in sufficient quantities to absorb any quantity of heat during the grinding process, and typically decrease the temperature of the substrate and/or abrasive as compared to the same process except omitting the coolant. Abrasives that may be included in compositions of the present disclosure include, but are not limited to, alumina ($Al_3O_2$), ceramic aluminium oxide, titania ($TiO_2$), cubic boron nitride ("CBN"), zirconia, zirconium oxide, silicon carbide, zirconia alumina, diamond, ceramics, cerium oxide, zirconia-spinel, other suitable abrasives, and/or any combination thereof. In some embodiments abrasives can be, but are not limited to, coated, bonded, and/or unbonded abrasives. For example, in some embodiments one or more abrasives may be included in a fluid composition, and/or one or more abrasives may be bonded to a grinding wheel, grinding pad, grinding belt, felt and/or other similar device that can be placed on and/or removed from a grinding machine and/or used to grind a substrate as disclosed herein.

Coolants that may be used in embodiments of the present disclosure may be water-based, in that water comprises greater than about 40 percent by weight of the composition and less than about 99 percent by weight of the composition, greater than about 50 percent by weight of the composition and less than about 99 percent by weight of the composition, greater than about 60 percent by weight of the composition and less than about 99 percent by weight of the composition, and/or greater than about 70 percent by weight of the composition and less than about 99 percent by weight of the composition. Coolant compositions may comprise polyoxyalkylene glycols. When used, coolant compositions may, but do not have to, serve to lubricate and/or cool the interface between a substrate and a grinding surface, reduce the grinding energy, and/or remove heat from a substrate and/or a grinding surface.

Coolant compositions disclosed herein may be prepared or provided as a concentrated solution of a polyoxyalkylene glycol. Such concentrated solution may also comprise one or more additives in the composition of matter. Prior to use, such a concentrate may be diluted with water. Additionally or alternatively, other aqueous solutions may be used to dilute a concentrate solution comprising a polyoxyalkylene glycol. In certain embodiments, the coolant may be used straight or diluted. For example, recycled batches of coolant may be re-used as a diluent. Coolant compositions of the present disclosure may be used neat (i.e., without further dilution), or may be diluted.

In certain embodiments, the polyoxyalkylene glycol may have a viscosity of, but not limited to, greater than or equal to about 5,000 centipoise (cP). In other embodiments, the polyoxyalkylene glycol may have a viscosity of greater than or equal to about 90,000 cP. In additional embodiments, the polyoxyalkylene glycol may have a viscosity of greater than about 200,000 cP. In still other embodiments, the polyoxyalkylene glycol may have a viscosity of greater than or equal to about 280,000 cP. In still other embodiments, the polyoxyalkylene glycol may have a viscosity of greater than or equal to about 380,000 cP.

In certain embodiments, the viscosity may be measured by viscometer, however, a rheometer may also be used. The viscosity as used herein, generally refers to the viscosity of a substrate at room temperature and atmospheric conditions, however, the viscosity may be measured at a temperature higher than room temperature if necessary depending on the viscosity of the material being evaluated.

When used in lubricating and/or coolant compositions, polyoxyalkylene glycol may comprise between greater than about 0 percent by weight to about 50 percent by weight of the composition. In other embodiments, the polyoxyalkylene glycol may comprise between about 3 percent by weight to about 25 percent by weight of the composition. In still other embodiments, the polyoxyalkylene glycol may comprise between about 5 percent by weight to about 15 percent by weight of the composition.

There are many current and available sources of manufacturers, sellers, and/or resellers of polyoxyalkylene glycols. In some embodiments of the present disclosure, the polyoxyalkylene glycol used may be purchased from and/or manufactured by, for example, but not limited to DOW, BASF, and/or Clariant. In some other embodiments, the polyoxyalkylene glycol used may be sold under the existing trade names or trademarks JEFFOX, JEFFOX WL-5000 and/or UCON™.

In embodiments of the present disclosure, grinding may be accomplished by any suitable machine or apparatus. For example, a diamond drill, a grinding or polishing wheel, a grinding belt, a polishing belt, a grinding pad, a polishing pad, a grinding disc, a polishing disc, and/or any other appropriate surfacing or grinding tool may be used to grind, polish, and/or surface a substrate.

Figure 1B:
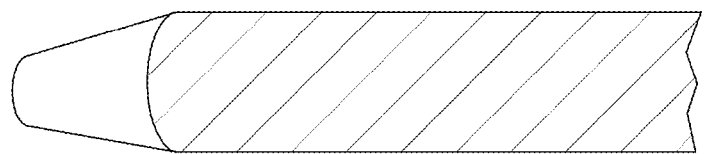
FIG. 1B shows a side view of an embodiment of a rounded edge configuration.
Figure 1C:
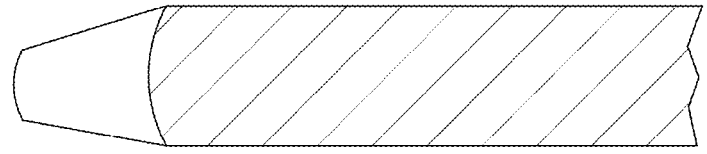
FIG. 1C shows a side view of an embodiment of a pencil edge configuration.
Figure 1D:
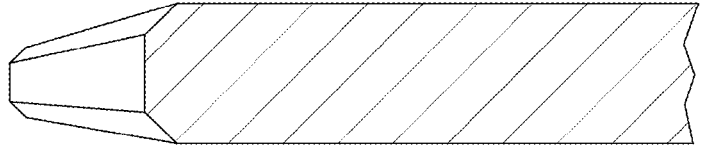
FIG. 1D shows a side view of an embodiment of a flat polished edge configuration.
Figure 1E:
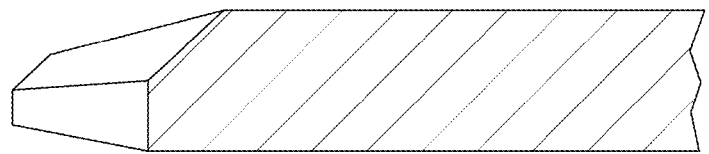
FIG. 1E shows a side view of an embodiment of a half bull nose edge.
Figure 1F:
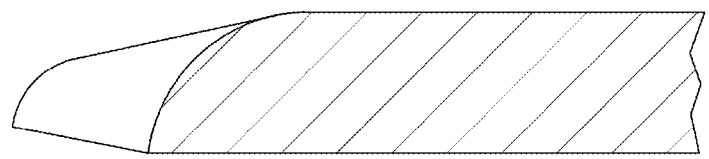
FIG. 1F shows a side view of an embodiment of a chamfer edge configuration.
Figure 1G:
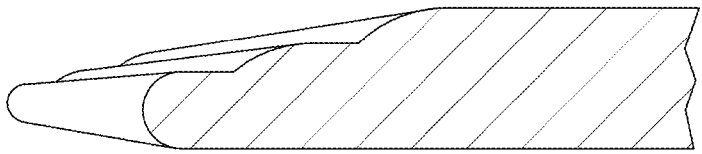
FIG. 1G shows a side view of one embodiment of a waterfall edge configuration.
Figure 1H:
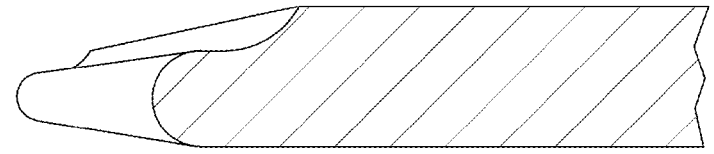
FIG. 1H shows a side view of an embodiment of a O.G. edge or Ogee edge configuration.

In certain embodiments, a polyxoyalkylene glycol may be used in methods for grinding an edge of glass to modify the edge and produce a modified edge configuration. In some embodiments such edge configurations include a beveled edge, rounded edge, pencil edge, flat edge, chamfer edge, half bull nose edge, O.G. edge, or a waterfall edge configuration. Various edge configurations such as these are shown in FIG. 1. FIG. 1A shows one embodiment of a side view of a beveled edge configuration. FIG. 1B shows one embodiment of a side view of a rounded edge configuration. FIG. 1C shows one embodiment of a side view of a pencil edge configuration. FIG. 1D shows one embodiment of a side view of a flat polished edge configuration. FIG. 1E shows one embodiment of a side view of a half bull nose edge. FIG. 1F shows one embodiment of a side view of a chamfer edge configuration. FIG. 1G shows one embodiment of a waterfall edge configuration. FIG. 1H shows a side view of one embodiment of a O.G. edge or Ogee edge configuration.

As used with regards to embodiments disclosed herein, the "specific grinding energy," or sometimes more simply the "grinding energy," is the energy that must be expended to remove a unit of volume from a substrate. In some embodiments, the mechanical energy used to remove material from a grinding surface is converted into heat energy. Such heat energy can be transferred by conduction through a substrate, can be radiated from a substrate, and/or can be removed by convection away from a substrate. However, in some circumstances, enough heat energy may be generated which may lead to damage of the substrate by, for example but not limited to, chipping, burning, and/or other surface or subsurface damage.

In certain embodiments of the present disclosure, the methods may have a reduced grinding energy. Without being bound by theory, this reduced grinding energy may therefore may reduce damage to a substrate. In other aspects of the present disclosure, the coolant fluid may be used to transfer heat away from a substrate. Therefore, in some embodiments, it may be desirable to use a coolant fluid that has a high or higher heat capacity to reduce the occurrence of damage to a substrate.

The grinding ratio, or "G ratio" is the ratio of volume of material removed from a substrate to the volume of material removed from a grinding surface. Typically, it is desirable to have a large positive value for the G ratio, meaning that a particular grinding surface removes a large volume of substrate relative to the volume of the grinding surface removed. The G ratio may be used as a surrogate for other values, such as the lifetime of a particular grinding surface, wheel dressing cycles, the efficiency of a process, and/or other indicators.

In some methods of the present disclosure, the rate of removal of substrate material from the substrate may be between about 0 cubic centimeters per minute (cc/min) to about 50 centimeters per minute (cc/min). In other embodiment, the removal rate may be between about 5 cubic centimeters per minute (cc/min) to about 40 cubic centimeters per minute (cc/min). In still other embodiments, the removal rate may be between about 10 cubic centimeters per minute (cc/min) to about 30 cubic centimeters per minute (cc/min). In still other embodiments, the removal rate may be between about 15 cubic centimeters per minute (cc/min) to about 20 cubic centimeters per minute (cc/min).

Additives that may be included in formulations of the coolant compositions of the present disclosure include, but are not limited to, a pH modifier (for example, but not limited to an acid, a base, and/or a buffer system), a surfactant, quenchants, chelators (for example, but not limited to, EDTA), an amine (for example, but not limited to ethylamine, monoethanolamine, triethanolamine, trimethylamine, or any suitable amine, and/or combinations thereof), a surfactant (for example, but not limited to a cationic surfactant, an anionic surfactant, and/or a neutral surfactant), a defoaming agent, a settling aid, a carboxylic acid, a boric acid or a derivative of boric acid, an abrasive, a carboxylic acid (for example, but not limited to, caprylic acid, neodecanoic acid, hexanoic acid, pelargonic acid, and/or a $C_8$ through $C_{16}$ carboxylic acid), a passivator, a corrosion control additive, a microbial control agent, an anti-misting agent, and/or any combination thereof. A derivative of boric acid as used herein means a compound related to boric acid wherein one or more —OH groups of boric acid is replaced by an alkyl group or other suitable functional group. When alkyl groups are used to replace one or more —OH groups of boric acid, such alkyl groups may have a carbon chain comprising between about 1 carbon atom to about 18 carbon atoms in the alkyl chain, and be present as a linear alkyl group or a branched alkyl group. When an alkylamine is used, the alkylamine may comprise an alkyl group having a carbon chain of between about 1 carbon to about 18 carbons in the alkyl chain and be present as a linear alkyl group or a branched alkyl group. The alkyl chain of an alkylamine may comprise one or more additional functional groups, for example, but not limited to hydroxyl groups (—OH).

When used in some embodiments, an additive may be included in a quantity of up to about 30 percent by weight of the final composition. In other embodiments, when used, an additive may be included in a quantity of up to about 8 percent by weight of the final composition. In still other embodiments, when an additive is used, it may be included in up to about 6 percent by weight of the final composition. In still other embodiments, when an additive is used, it may be used in a quantity of up to about 5 percent by weight of the final composition. In certain embodiments, when more than one additive is used, the total quantity of all additives may be up to about 55 percent by weight. In still other embodiments, when more than one additive is used, the total quantity of all additives may be up to about 25 percent by weight. In still other embodiments, when more than one additive is used, the total quantity of all additives may be up to about 10 percent by weight.

In certain embodiments, the coolant has a pH of between about 6 and about 11. In other preferred embodiments, the coolant has a pH of between about 8 and about 11. In more preferred embodiments, the coolant has a pH of between about 8.5 to about 9.5.

The coolant used in certain embodiments of the present disclosure may be recycled and/or re-used. For example, glass particles may be removed from a coolant by physical separation, such as, but not limited to centrifugation or decanting. The coolant may be cooled, for example by dilution with water and/or another solvent or unused coolant composition, refrigeration, storage, or any other suitable method for cooling the coolant composition in order for the temperature of the coolant composition of matter to be lowered.

In order to promote a further understanding of the present invention and its various embodiments, the following specific examples are provided. It will be understood that these examples are illustrative and not limiting of the invention.

EXAMPLE 1

Preparation of Coolant

A coolant was prepared by mixing the following components in amounts to constitute the following percentages by weight of the total composition to form a generally homogenous solution:

TABLE 1

Composition of EXAMPLE 1.

| Constituent | Percentage by weight of the total composition (w/w) |
|---|---|
| trimethylamine | 7% |
| monoethanolamine | 7% |
| boric acid | 5% |
| Jeffox WL-5000 | 14% |
| Chelating agent or metal surface conditioner | 0.001% |
| defoamer | 0.003% |
| POA 31-R-1 | 0.001% |
| water | 66.995 |
| Total | 100% |

EXAMPLE 2

Preparation of Coolant

A coolant was prepared by mixing the following components in amounts to constitute the following percentages by weight of the total composition to form a generally homogenous solution:

TABLE 2

Composition of EXAMPLE 2.

| Constituent | Percentage by weight of the total composition (w/w) |
|---|---|
| trimethylamine | 6% |
| monoethanolamine | 1% |
| boric acid | 3% |
| Glycol 280,000 | 26% |
| chelating agent | 0.002% |
| defoamer | 0.003% |
| water | 63.995% |
| Total | 100% |

EXAMPLE 3

Characterization of Coolants

The coolant compositions of EXAMPLE 1 and EXAMPLE 2 where evaluated for removal rate, grinding energy, and G-ratio, and compared to a control coolant marketed under the trade name DR Lubricants GF 2000, whose composition is unknown. These data are summarized in Table 3.

TABLE 3

Comparison of the coolants of EXAMPLE 1, EXAMPLE 2, and a control coolant.

| Composition | Removal rate (cc/min) | Grinding Energy (J/cm$^3$) | G-ratio |
|---|---|---|---|
| EXAMPLE 1 | 13.62 | 1887.6 | 51,150 |
| EXAMPLE 2 | 25.74 | 834.6 | 74,471 |
| Control, DR Lubricants GF 2000 | 17.19 | 2111.6 | 78,784 |

FIG. 2 shows a graphical summary of the grind ratio, removal rates, and specific grinding energies observed when various commercial coolants (labeled A through H) were evaluated, along with a coolant according to one embodiment of the present disclosure.

EXAMPLE 4

Preparation of Coolant

A coolant was prepared by mixing the following components in amounts to constitute the following percentages by weight of the total composition to form a generally homogenous solution:

TABLE 4

Composition of EXAMPLE 4.

| Constituent | Percentage by weight of the total composition (w/w) |
|---|---|
| water | 57.4 |
| trimethylamine | 14% |
| monoethanolamine | 6% |
| caprylic acid | 10% |
| boric acid | 2% |
| PAG 210,000 | 10% |
| Wintrol-90 | 0.002% |
| defoamer | 0.003% |
| Pluronic 31R1 | 0.002% |

Once prepared, this coolant was evaluated on 4 mil automotive glass and the G-ratio was measured to be 97,312; the removal rate was measured to be 23.1 cc/min; and the grinding energy was measured to be 1975 J/cm$^3$.

The uses of the terms "a" and "an" and "the" and similar references in the context of describing the invention (especially in the context of the following claims) are to be construed to cover both the singular and the plural unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

While the invention has been illustrated and described in detail in the drawings and the foregoing description, the same is to be considered as illustrative and not restrictive in character, it being understood that only the preferred embodiment has been shown and described and that all changes and modifications that come within the spirit of the invention are desired to be protected. In addition, all references cited herein are indicative of the level of skill in the art and are hereby incorporated by reference in their entirety.

What is claimed is:

1. A composition of matter useful for cooling a substrate, comprising:
   a polyoxyalkylene glycol; and
   one or more alkanolamines;
   wherein said polyoxyalkylene glycol has an a viscosity of greater than or equal to about 280,000 cP, or greater than or equal to about 380,000 cP.

2. The composition of claim 1, wherein said one or more alkanolamines comprises monoethanolamine, diethanolamine, triethanolamine, or a combination thereof.

3. The composition of claim 1, wherein said one or more alkanolamines comprises up to about 30 percent by weight of the composition.

4. The composition of claim 1, wherein said one or more alkanolamines comprises up to about 25 percent by weight of the composition.

5. The composition of claim 1, wherein said one or more alkanolamines comprises up to about 20 percent by weight of the composition.

6. The composition of claim 1, further comprising water.

7. The composition of claim 1, wherein the composition comprises between about 1 percent by weight and about 20 percent by weight boric acid or a derivative thereof.

8. The composition of claim 1, wherein the composition comprises between about 5 percent by weight and about 15 percent by weight boric acid or a derivative thereof.

9. The composition of claim 1, wherein the composition comprises between about 7 percent by weight and about 12 percent by weight boric acid or a derivative thereof.

10. The composition of claim 1, wherein the composition comprises about 10 percent by weight boric acid or a derivative thereof or about 12 percent by weight boric acid or a derivative thereof.

11. The composition of claim 1, wherein the composition comprises a chelating agent.

12. The composition of claim 1, wherein the composition comprises ethylenediaminetetraacetic acid or a salt thereof.

13. The composition of claim 1, wherein the composition comprises between about 0.001 percent by weight to about 0.2 percent by weight of ethylenediaminetetraacetic acid or a salt thereof.

14. The composition of claim 1, further comprising a carboxylic acid.

15. The composition of claim 1, wherein the composition comprises between about 0.1 percent by weight to about 5 percent by weight of a carboxylic acid.

16. The composition of claim 1, wherein the composition comprises a carboxylic acid comprising between about 8 carbon atoms to about 15 carbon atoms.

17. The composition of claim 1, further comprising caprylic acid, neodecanoic acid, hexanoic acid, or pelargonic acid.

18. The composition of claim 1, further comprising a surfactant.

19. The composition of claim 1, further comprising a biocide or a fungicide.

20. The composition of claim 1, comprising a corrosion inhibitor, a passivator, defoamer, or a combination thereof.

21. A method for grinding a substrate, the method comprising:
   grinding the substrate in the presence of a coolant of claim 1.

22. The method of claim 21, wherein said substrate is a glass substrate, a ceramic substrate, ophthalmic plastic, or a quartz substrate.

23. The method of claim 22, wherein said substrate is a glass substrate, and wherein said glass substrate is automotive glass, flat glass, ophthalmic glass, ophthalmic plastic, precision ophthalmic glass, solar glass, precision optical glass, lens glass, architectural glass, curtain wall glass, appliance glass, or electronic-device glass.

24. The method of claim 21, wherein said polyoxyalkylene glycol lowers the grinding energy at a grind interface between the abrasive and the substrate measured in Jules per cubic centimeter ($J/cm^3$), improves the removal rate measured in cubic centimeters per minute ($cm^3/min$), extends wheel dressing cycles, reduces burns, defects, or reduces the G Ratio during the grinding.

25. The method of claim 21, wherein the act of grinding the glass produces an edge configuration that is beveled, rounded, or pencil edged.

26. The method of claim 21, wherein said polyoxyalkylene glycol reduces the energy at the grind interface as compared to the corresponding process that excludes the coolant.

27. The method of claim 26, wherein said abrasive comprises alumina ($Al_3O_2$), ceramic aluminium oxide, titania ($TiO_2$), cubic boron nitride ("CBN"), zirconia, zirconium oxide, silicon carbide, zirconia alumina, diamond, ceramics, cerium oxide, zirconia-spinel, other suitable abrasives, or any combination thereof.

28. A composition of matter useful for cooling a substrate, consisting essentially of:
   a polyoxyalkylene glycol; and
   one or more alkanolamines;
   wherein said polyoxyalkylene glycol has an a viscosity of greater than or equal to about 280,000 cP, or greater than or equal to about 380,000 cP.

29. The composition of claim 28, wherein said one or more alkanolamines comprises monoethanolamine, diethanolamine, triethanolamine, or a combination thereof.

30. The composition of claim 28, further comprising an abrasive.

31. The composition of claim 30, wherein said abrasive comprises alumina ($Al_3O_2$), ceramic aluminium oxide, titania ($TiO_2$), cubic boron nitride ("CBN"), zirconia, zirconium oxide, silicon carbide, zirconia alumina, diamond, ceramics, cerium oxide, zirconia-spinel, other suitable abrasives, or any combination thereof.

* * * * *

UNITED STATES PATENT AND TRADEMARK OFFICE
CERTIFICATE OF CORRECTION

PATENT NO. : 10,155,893 B2
APPLICATION NO. : 15/411383
DATED : December 18, 2018
INVENTOR(S) : Larry Lindland It is certified that error appears in the above-identified patent and that said Letters Patent is hereby corrected as shown below:

In the Specification
Column 3, Line 53, replace "$Al_3O_2$" with --$Al_2O_3$--

In the Claims
Column 10, Claim 27, Line 37, replace "$Al_3O_2$" with --$Al_2O_3$--
Column 10, Claim 31, Line 55, replace "$Al_3O_2$" with --$Al_2O_3$--

Signed and Sealed this
Tenth Day of March, 2020

Andrei Iancu
*Director of the United States Patent and Trademark Office*